(12) United States Patent
Yu et al.

(10) Patent No.: US 11,960,144 B2
(45) Date of Patent: Apr. 16, 2024

(54) OPTICAL LENS, CAMERA MODULE AND TERMINAL CAMERA

(71) Applicant: JIANGXI LIANYI OPTICS CO., LTD., Nanchang (CN)

(72) Inventors: Xiaozhi Yu, Nanchang (CN); Haojie Zeng, Nanchang (CN); Xuming Liu, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 509 days.

(21) Appl. No.: 17/367,294

(22) Filed: Jul. 2, 2021

(65) Prior Publication Data

US 2021/0349291 A1 Nov. 11, 2021

Related U.S. Application Data

(63) Continuation-in-part of application No. PCT/CN2021/088769, filed on Apr. 21, 2021.

(30) Foreign Application Priority Data

May 7, 2020 (CN) .......................... 202010375115.4

(51) Int. Cl.
*G02B 9/60* (2006.01)
*G02B 13/00* (2006.01)
*G02B 27/00* (2006.01)

(52) U.S. Cl.
CPC ........... *G02B 9/60* (2013.01); *G02B 13/0045* (2013.01); *G02B 27/0025* (2013.01)

(58) Field of Classification Search
CPC ........ G02B 13/0045; G02B 9/60; G02B 9/64; G02B 9/62; G02B 27/0025
(Continued)

(56) References Cited

U.S. PATENT DOCUMENTS

2011/0316969 A1  12/2011  Dung et al.
2016/0202454 A1* 7/2016  Chang ...................... G02B 9/60
                                                                 348/360
(Continued)

FOREIGN PATENT DOCUMENTS

CN    104635323 A    5/2015
CN    106680966 A    5/2017
(Continued)

OTHER PUBLICATIONS

WIPO, International Search Report for PCT Application No. PCT/CN2021/088769, dated Jul. 2, 2021.
(Continued)

*Primary Examiner* — George G. King

(57) ABSTRACT

Disclosed are an optical lens, a camera module and a terminal camera. From an object side to an image side, the optical lens include: a first lens with a negative focal power, which has a convex object side surface and a concave image side surface; a stop; a second lens with a positive focal power, which has a convex object side surface and a concave image side surface; a third lens with a positive focal power, which has a convex object side surface and a concave image side surface; a fourth lens with a positive focal power, which has a convex object side surface and a convex image side surface; a fifth lens with a negative focal power, an object side surface of the fifth lens is convex at a paraxial region and an image side surface of the fifth lens is concave at a paraxial region; and a filter.

20 Claims, 8 Drawing Sheets

(58) Field of Classification Search
USPC .................................................. 359/713–714
See application file for complete search history.

(56) References Cited

U.S. PATENT DOCUMENTS

2019/0101728 A1* 4/2019 Hsieh ................. G02B 13/0045
2019/0137736 A1* 5/2019 Huh ................... G02B 13/0045

FOREIGN PATENT DOCUMENTS

| CN | 106886080 A | 6/2017 |
| CN | 110297317 A | 10/2019 |
| CN | 110727083 A | 1/2020 |
| JP | 2015069206 A | 4/2015 |
| JP | 2017223755 A | 12/2017 |

OTHER PUBLICATIONS

WIPO, Written opinion of the International Search Authority for PCT Application No. PCT/CN2021/088769, dated Jul. 2, 2021.
SIPO, First Office Action for CN Application No. 202010375115.4, dated Jun. 28, 2020.
SIPO, Notification to Grant Patent Right for Invention for CN Application No. 202010375115.4, dated Jul. 20, 2020.

* cited by examiner

OPTICAL LENS, CAMERA MODULE AND TERMINAL CAMERA

CROSS-REFERENCE TO RELATED APPLICATION

This application is a continuation-in-part of an international application No. PCT/CN2021/088769 filed on Apr. 21, 2021. This international application No. PCT/CN2021/088769 claims priority to a CN application No. 202010375115.4 filed on May 7, 2020. The entirety of the above-mentioned applications is hereby incorporated by reference for all purposes.

TECHNICAL FIELD

The present disclosure relates to the field of lens imaging technologies, and particularly to an optical lens, a camera module and a terminal camera.

BACKGROUND

In recent year, three-dimensional depth recognition technology develops rapidly. Meanwhile, the time of flight (ToF) stereo depth-perception lens (which is called ToF lens for short below) having three-dimensional spatial perception capacity begins a new future for depth information, and is widely concerned and applied in the smart phone industry. The ToF technology is such a technology which locates a target object by detecting the flight (round-trip) time of light pulses. Due to characteristics such as strong anti-interference and high frames per second (FPS) refresh rate, the ToF lens becomes a basic configuration for smart phones.

At present, the ToF lens has unique advantages in face recognition, stereo imaging, and somatosensory interaction etc. On one hand, as the electronic products require ultra-high definition and tend to become lighter, thinner, shorter and smaller, the ToF lens equipped on the electronic products is required to have high resolution and small size. On the other hand, because the most iconic function of the ToF technology is to measure data information such as depth of field, the ToF lens is required to have a wide angle and a large aperture, to achieve the precise measurement of distance information. However, the existing optical lenses applied in the smart phones cannot meet these requirements simultaneously. Therefore, it is an urgent problem for lens manufacturers to provide an imaging system having small size, wide angle and large aperture and applicable to the ToF technology, under the premise of ensuring the imaging quality of the lens.

SUMMARY

In a first aspect, an optical lens is provided in the embodiments of the present disclosure. From an object side to an image side along an optical axis, the optical lens sequentially includes a first lens with a negative focal power, where an object side surface of the first lens is convex, and an image side surface of the first lens is concave; a stop; a second lens with a positive focal power, where an object side surface of the second lens is convex, and an image side surface of the second lens is concave; a third lens with a positive focal power, where an object side surface of the third lens is convex, and an image side surface of the third lens is concave; a fourth lens with a positive focal power, where both an object side surface of the fourth lens and an image side surface of the fourth lens are convex; a fifth lens with a negative focal power, where an object side surface of the fifth lens is convex at a paraxial region thereof and has at least one inflection point, and an image side surface of the fifth lens is concave at a paraxial region thereof and has at least one inflection point; and a filter. The optical lens meets an expression: $2.0 \text{ mm} < (TTL/IH)*f < 2.2 \text{ mm}$; where TTL represents a distance from the object side surface of the first lens to an imaging plane of the optical lens on the optical axis, IH represents an actual image height of the optical lens on the imaging plane, and f represents an effective focal length of the optical lens.

In a second aspect, an imaging device is provided in the embodiments of the present disclosure, which includes the optical lens provided in the first aspect and an imaging element. The imaging element is configured to convert an optical image formed by the optical lens to an electronic signal.

In a third aspect, a camera module is provided in the embodiments of the present disclosure, which includes the optical lens mentioned in the first aspect and an image sensor opposite to the optical lens.

In a fourth aspect, a terminal camera is provided in the embodiments of the present disclosure, which includes a camera module, a processor and a memory. The camera module is configured to capture one or more images. The processor is configured to process the captured images. The memory is configured to store the captured images. The camera module includes an optical lens mentioned in the first aspect and an image sensor opposite to the optical lens.

Figure 1:
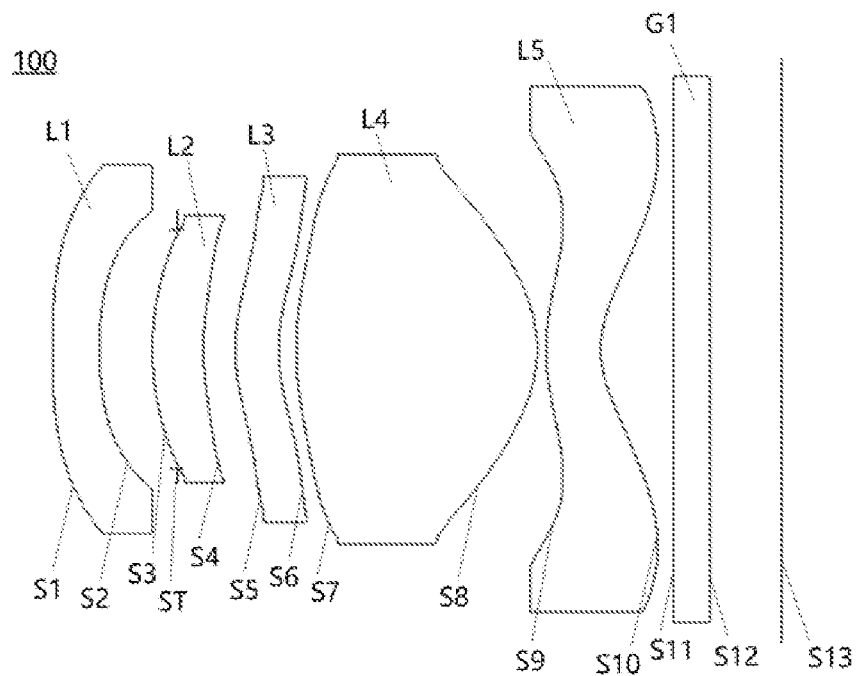
FIG. 1 is a schematic structural diagram of an optical lens in a first embodiment of the present disclosure.

The following specific embodiments will further illustrate the present disclosure in conjunction with the above-mentioned drawings.

DETAILED DESCRIPTION OF PREFERRED EMBODIMENTS

In order to facilitate understanding of the present disclosure, the present disclosure will be described comprehensively below with reference to the related drawings. Various embodiments of the present disclosure are shown in the drawings. However, the present disclosure can be implemented in many different forms and is not limited to the embodiments described herein. Rather, the purpose of providing these embodiments is to make the disclosure more thorough and comprehensive.

An optical lens is provided in the embodiments of the present disclosure. From an object side to an image side along an optical lens, the optical lens sequentially includes a first lens with a negative focal power, where an object side surface of the first lens is convex, and an image side surface of the first lens is concave; a stop; a second lens with a positive focal power, where an object side surface of the second lens is convex, and an image side surface of the second lens is concave; a third lens with a positive focal power, where an object side surface of the third lens is convex, and an image side surface of the third lens is concave; a fourth lens with a positive focal power, where both an object side surface of the fourth lens and an image side surface of the fourth lens are convex; a fifth lens with a negative focal power, where an object side surface of the fifth lens is convex at a paraxial region thereof and has at least one inflection point, an image side surface of the fifth lens is concave at a paraxial region thereof and has at least one inflection point; and a filter. The optical lens meets an expression:

$$2.0 \text{ mm} < (TTL/IH)*f < 2.2 \text{ mm}; \quad (1)$$

where TTL represents a distance from the object side surface of the first lens to an imaging plane of the optical lens on the optical axis, IH represents an actual image height of the optical lens on the imaging plane, and f represents an effective focal length of the optical lens. When the expression (1) is satisfied, the effective focal length and the total length of the optical lens can be effectively controlled, which facilitates miniaturization of the optical lens.

In some implementations, the optical lens meets an expression:

$$0.48 \text{ mm}^{-1} < \tan^2(HFOV)/DM1 < 0.54 \text{ mm}^{-1}; \quad (2)$$

where HFOV represents half the maximum FOV of the optical lens, and DM1 represents an effective diameter of the first lens. When the expression (2) is satisfied, it is beneficial to enlarge the FOV on the object side, meanwhile, the optical lens is enabled to have a large aperture and a small size of the head to reduce an opening area of the screen, thereby facilitating miniaturization of the optical lens.

In some implementations, the optical lens meets an expression:

$$-0.15 < (R21-R22)/(R21+R22) < 0.1; \quad (3)$$

where R21 represents a radius of curvature of the object side surface of the second lens, and R22 represents a radius of curvature of the image side surface of the second lens. When the expression (3) is satisfied, the focal power of the second lens can be reasonably configured to facilitate correction of field curvature and distortion, and the surface profiles of the second lens can also be reasonably controlled to promote resolution of the optical lens.

In some implementations, the optical lens meets an expression:

$$40 \text{ mm} < f2+f3 < 70 \text{ mm}; \quad (4)$$

where f2 represents an effective focal length of the second lens, and f3 represents an effective focal length of the third lens. When the expression (4) is satisfied, the focal power of the second lens and the third lens can be reasonably allocated, which is beneficial to achieve a large aperture of the optical lens, and to reduce the diameters of subsequent lenses and the size of the optical lens.

In some implementations, the optical lens meets an expression:

$$0.1 < TC23/R22 < 0.14; \quad (5)$$

where TC23 represents a spacing distance on the optical axis from the image side surface of the second lens to the object side surface of the third lens, and R22 represents the radius of curvature of the image side surface of the second lens. When the expression (5) is satisfied, the spacing between the second lens and the third lens can be reasonably controlled, to reduce the difficulty in correcting the image aberration; and the sensitivity to the spacing between the second lens and the third lens can also be reduced, and the yield can be promoted.

In some implementations, the optical lens meets an expression:

$$0.92 \text{ mm} < TC12+T2+TC23 < 0.98 \text{ mm}; \quad (6)$$

where TC12 represents a spacing distance between the image side surface of the first lens and the object side surface of the second lens on the optical axis, T2 represents a center thickness of the second lens, and TC23 represents a spacing distance on the optical axis from the image side surface of the second lens to the object side surface of the third lens. When the expression (6) is satisfied, the center thickness of the second lens and the spacing distance between the front and rear lenses can be reasonably allocated to adjust the distribution of light, thereby facilitating the correction of spherical aberration of the optical lens, reducing the influence of the temperature change on the performance of the optical lens, and facilitating the structure compactness of the optical lens.

In some implementations, the optical lens meets expressions:

$$0.4 < (R11-R12)/(R11+R12) < 0.9; \quad (7)$$

$$0.09 < T1/DM1 < 0.14; \quad (8)$$

where R11 represents a radius of curvature of the object side surface of the first lens, R12 represents a radius of curvature of the image side surface of the first lens, T1 represents a center thickness of the first lens, and DM1 represents an effective diameter of the first lens. When the expressions (7) and (8) are satisfied, on one hand, the surface profiles of the first lens can be reasonably controlled, which enables a large FOV to be enabled, and also enables light to converge and the diameters of the subsequent lenses and the size of the optical lens to be reduced; on the other hand, the difficulty of molding the first lens can be reduced, thereby reducing the processing sensitivity and improving the yield.

In some implementations, the optical lens meets an expression:

$$0.05 < f/f3 < 0.13; \quad (9)$$

where f3 represents an effective focal length of the third lens, and f represents the effective focal length of the optical lens. When the expression (9) is satisfied, the third lens is enabled to have a large positive focal power, which is beneficial to remove the influence of the temperature change on the imaging performance, thereby providing the optical lens with good temperature tolerance.

In some implementations, the optical lens meets an expression:

$$0.9 < R31/R32 < 1.1; \quad (10)$$

where R31 represents a radius of curvature of the object side surface of the third lens, and R32 represents a radius of curvature of the image side surface of the third lens. When the expression (10) is satisfied, inflection of the light can be effectively controlled, thereby slowing down the trend of light inflection and reducing the difficulty in correcting the image aberration.

In some implementations, the optical lens meets expressions:

$$0.70 < f4/f < 0.75; \quad (11)$$

$$-1.7 < f5/f < -1.2; \quad (12)$$

where f4 represents an effective focal length of the fourth lens, f5 represents an effective focal length of the fifth lens, and f represents the effective focal length of the optical lens. When the expressions (11) and (12) are satisfied, the focal power of the fourth lens and the fifth lens can be reasonably allocated, thereby slowing down the trend of light inflection; and the sensitivities of the fourth lens and the fifth lens can be reduced, the correction of high-order aberration is reduced, thereby reducing the difficulty in correcting the image aberration of the whole lens.

In some implementations, the optical lens meets expressions:

$$1.8 < R51/R52 < 2.2; \quad (13)$$

$$0.2 < SAG52_i - SAG51_i < 0.5; \quad (14)$$

where R51 represents a radius of curvature of the object side surface of the fifth lens, R52 represents a radius of curvature of the image side surface of the fifth lens, $SAG51_i$ represents a vector height at any point of the object side surface of the fifth lens, $SAG52_i$ represents a vector height at any point of the image side surface of the fifth lens and i represents the any point. When the expression (13) is satisfied, the fifth lens has a small negative focal power for converging the light, thereby effectively correcting the field curvature and the image aberration of the optical lens; at the same time, the distribution of the incident angle of the light can be reasonably controlled to ensure the imaging definition under various fields. When the expression (14) is satisfied, the surface profiles of the fifth lens can be reasonably controlled, and the imaging quality of the optical lens is improved.

In some implementations, the first lens, the second lens, the third lens, the fourth lens and the fifth lens are all plastic aspherical lenses.

Surface shapes of the aspherical lenses in the embodiments of the present disclosure all meet an expression:

$$z = \frac{ch^2}{1 + \sqrt{1 - (1+k)c^2h^2}} + \sum A_{2i}h^{2i},$$

where z represents a vector height between a point on a curved surface and a vertex of the curved surface along an optical axis, h is a distance between the point on the curved surface and the optical axis, c is a paraxial curvature of the surface, k is quadratic surface coefficient, and $A_{2i}$ is a 2i-th order aspheric profile coefficient.

Different from the related art, by reasonably arranging the stop and the individual lenses, the optical lens provided in the present disclosure not only provides a high quality resolution capacity, but also has characteristics of a small outer diameter of the head, a short total length, high relative illumination, a wide angle, and a large aperture etc., and can satisfy the design requirements of the ToF technology.

Embodiment 1

Referring to FIG. 1, a schematic structural diagram of an optical lens 100 is provided in the first embodiment of the present disclosure. From an object side to an imaging plane, the optical lens sequentially includes a first lens L1, a stop ST, a second lens L2, a third lens L3, a fourth lens L4, a fifth lens L5, and a filter G1. The first lens L1, the second lens L2, the third lens L3, the fourth lens L4 and the fifth lens L5 are all plastic aspherical lenses.

The first lens L1 has a negative focal power. An object side surface S1 of the first lens is convex, and an image side surface S2 of the first lens is concave.

The second lens L2 has a positive focal power. An object side surface S3 of the second lens is convex, and an image side surface S4 of the second lens is concave.

The third lens L3 has a positive focal power. An object side S5 of the third lens is convex, and an image side surface S6 of the third lens is concave.

The fourth lens L4 has a positive focal power. An object side surface S7 of the fourth lens is convex, and an image side surface S8 of the fourth lens is convex.

The fifth lens L5 has a negative focal power. An object side surface S9 of the fifth lens is convex at a paraxial region thereof and has at least one inflection point, and an image side surface S10 of the fifth lens is concave at a paraxial region thereof and has at least one inflection point.

Correlated parameters of various lenses of the optical lens 100 provided in this embodiment are as shown in table 1, where R represents the radius of curvature, d represents the spacing distance between the optical surfaces, Nd represents the d-line refractivity of the materials, and Vd represents the Abbe number of the materials.

TABLE 1

| Surface No. | R | d | Nd | Vd |
|---|---|---|---|---|
| Object side — surface | | 400 | | |

TABLE 1-continued

| Surface No. | | R | d | Nd | Vd |
|---|---|---|---|---|---|
| S1 | L1 | 32.118234 | 0.19601166 | 1.6397 | 23.529 |
| S2 | | 2.0774955 | 0.46257201 | | |
| ST | ST | — | −0.2048894 | | |
| S3 | L2 | 1.1633607 | 0.31151777 | 1.535 | 55.711 |
| S4 | | 1.4334779 | 0.19824563 | | |
| S5 | L3 | 1.1598518 | 0.25338311 | 1.6397 | 23.529 |
| S6 | | 1.1261737 | 0.10514189 | | |
| S7 | L4 | 1.8525104 | 1.44247726 | 1.5445 | 55.987 |
| S8 | | −0.7159638 | 0.03091105 | | |
| S9 | L5 | 1.2006246 | 0.35532702 | 1.6397 | 23.529 |
| S10 | | 0.5516661 | 0.4201533 | | |
| S11 | G1 | — | 0.21 | 1.5168 | 64.198 |
| S12 | | — | 0.45269489 | | |
| S13 | Imaging plane | — | — | | |

Surface profile coefficients of various aspherical surfaces of the optical lens 100 in this embodiment are as shown in table 2-1 and table 2-2.

TABLE 2-1

| Surface No. | k | $A_4$ | $A_6$ | $A_8$ |
|---|---|---|---|---|
| S1 | 68.83252 | 0.241911 | −0.04703 | −0.23019 |
| S2 | −100.125 | 0.960977 | −2.04222 | 1.965977 |
| S3 | −1.34362 | −0.23929 | 0.611111 | −0.20053 |
| S4 | 2.11571 | −0.87573 | 1.855733 | −2.79978 |
| S5 | −4.23772 | −0.45625 | 0.482772 | −0.32813 |
| S6 | 0.017409 | −0.6704 | 0.210055 | 0.323375 |
| S7 | 0.498358 | −0.14952 | −0.227 | 0.456906 |
| S8 | −0.72447 | 0.570789 | −0.59708 | 0.386458 |
| S9 | −28.6736 | 0.244441 | −0.92975 | 0.998945 |
| S10 | −4.12859 | −0.06014 | −0.10942 | 0.128169 |

TABLE 2-2

| Surface No. | $A_{10}$ | $A_{12}$ | $A_{14}$ | $A_{16}$ |
|---|---|---|---|---|
| S1 | 0.552162 | −0.69478 | 0.475185 | −0.12988 |
| S2 | 12.02188 | −45.8856 | 61.96524 | −29.5939 |
| S3 | −2.2379 | 8.333497 | −13.0081 | 8.181677 |
| S4 | −0.94577 | 9.498085 | −8.4945 | −0.63347 |
| S5 | 0.44476 | −0.84567 | 1.460029 | −0.89901 |
| S6 | −0.19769 | −0.22713 | 0.312141 | −0.16005 |
| S7 | −0.09097 | −0.16849 | 0.075479 | −0.00081 |
| S8 | 0.035469 | −0.10638 | −0.03074 | 0.046483 |
| S9 | −0.33283 | −0.30994 | 0.310981 | −0.07661 |
| S10 | −0.04209 | −0.02006 | 0.017535 | −0.00335 |

Figure 2:
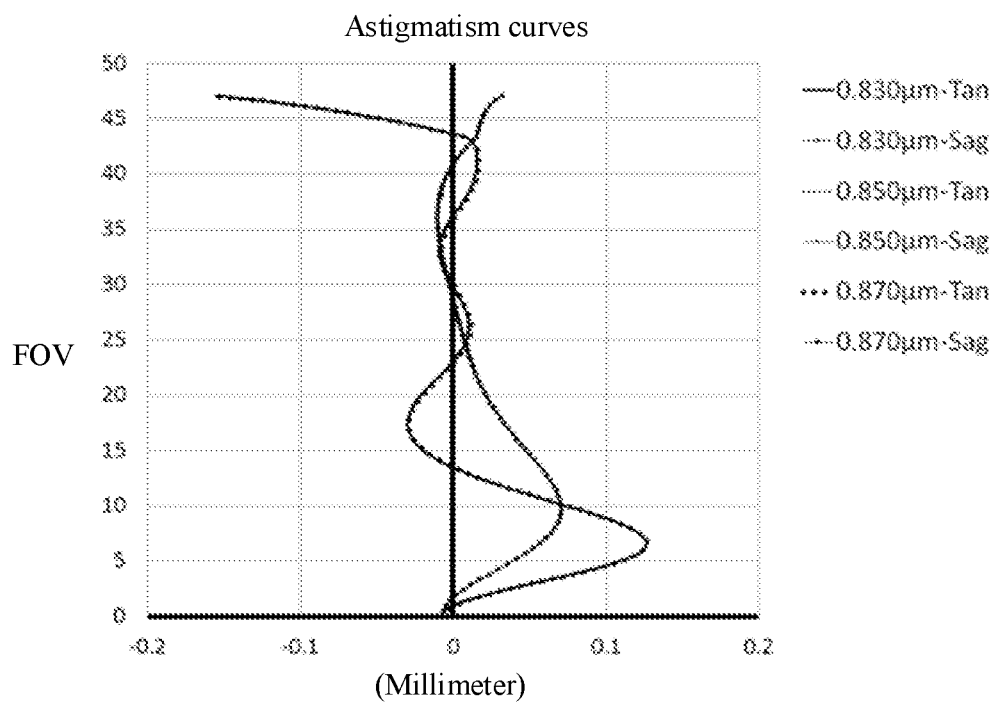
FIG. 2 is a diagram showing astigmatism curves of the optical lens in the first embodiment of the present disclosure, where the lateral axis represents the offset (unit: millimeter), and the longitudinal axis represents the field of view (FOV) (unit: degree)
Figure 6:
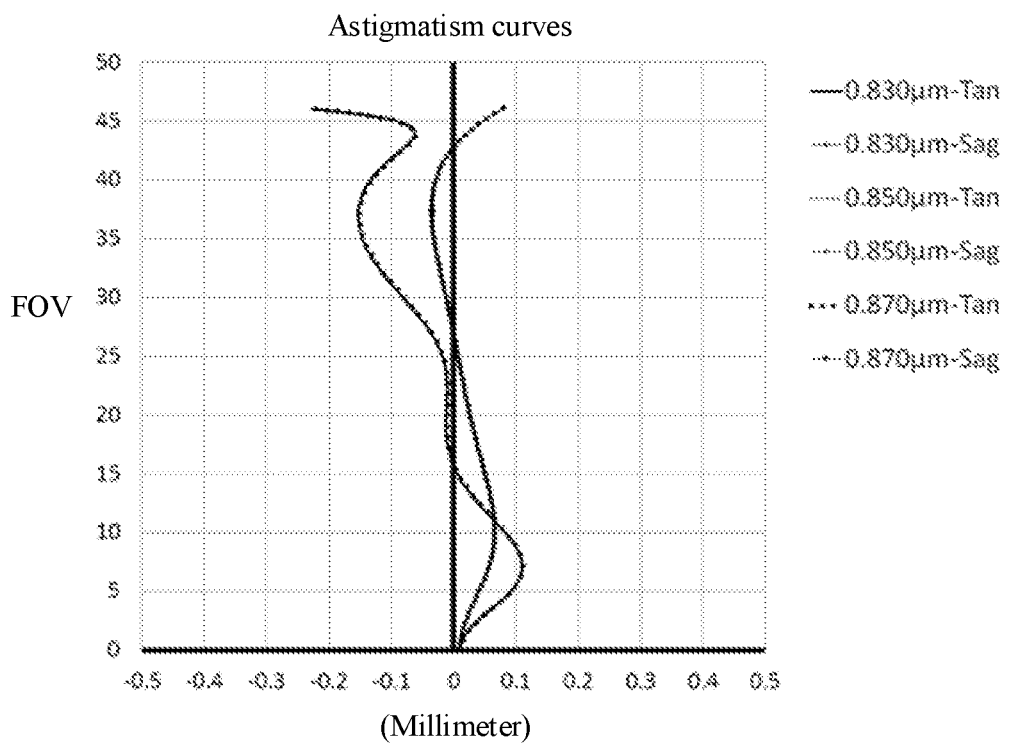
FIG. 6 is a diagram showing astigmatism curves of the optical lens in the second embodiment of the present disclosure.
Figure 10:
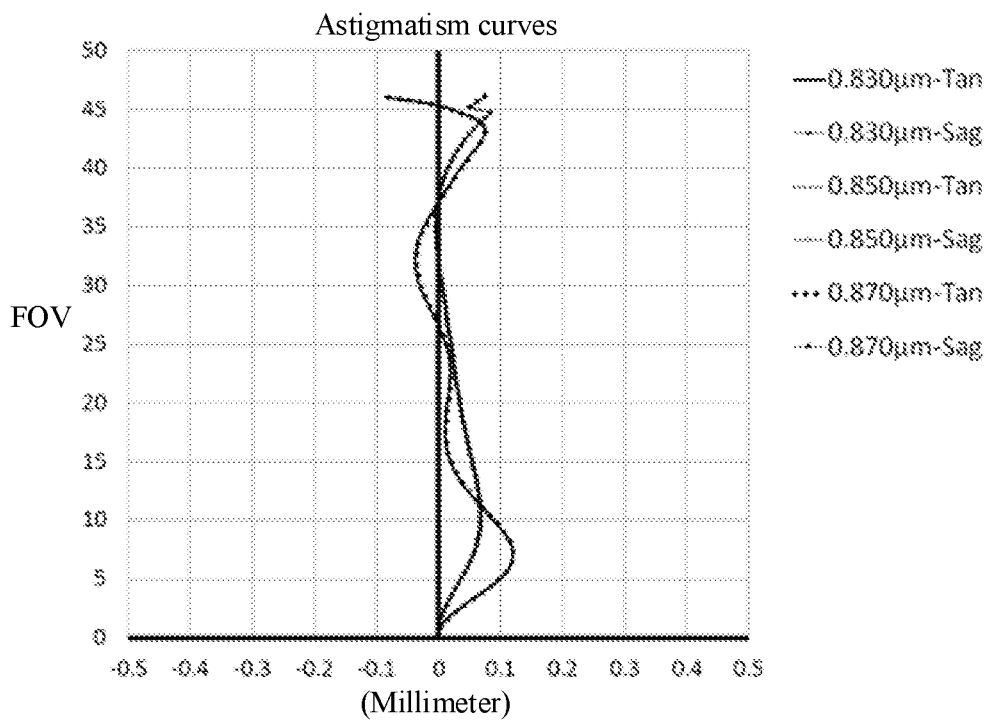
FIG. 10 is a diagram showing astigmatism curves of the optical lens in the third embodiment of the present disclosure.

FIG. 2 shows astigmatism curves of the optical lens 100 in this embodiment, which shows the curve degrees of the tangential image surface and the sagittal image surface. It can be seen that the astigmatism of the image surfaces in the tangential and sagittal directions is controlled within ±0.2 mm, which shows that the optical lens 100 is good in correcting the astigmatism. The 0.830 μm-Tan in the drawing represents a T (tangent) line of 830 nanometer wavelength, the 0.830 μm-Sag represents a S (sagitta) line of 830 nanometer wavelength and so on (FIG. 6 and FIG. 10 are similar to FIG. 2).

Figure 3:
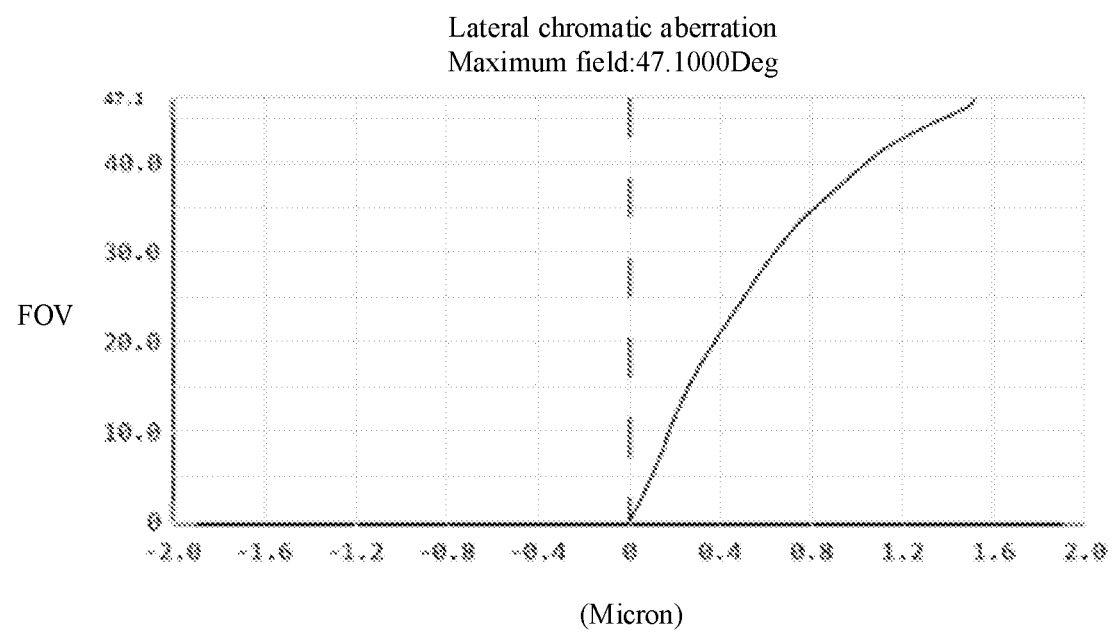
FIG. 3 is a diagram showing a lateral chromatic aberration curve of the optical lens in the first embodiment of the present disclosure, where the longitudinal axis represents the FOV (unit: degree), and the solid line represents the corresponding relationship between the FOV and the difference (unit: micron) obtained by subtracting the chromatic aberration of the longest wavelength light from the chromatic aberration of the shortest wavelength light.
Figure 7:
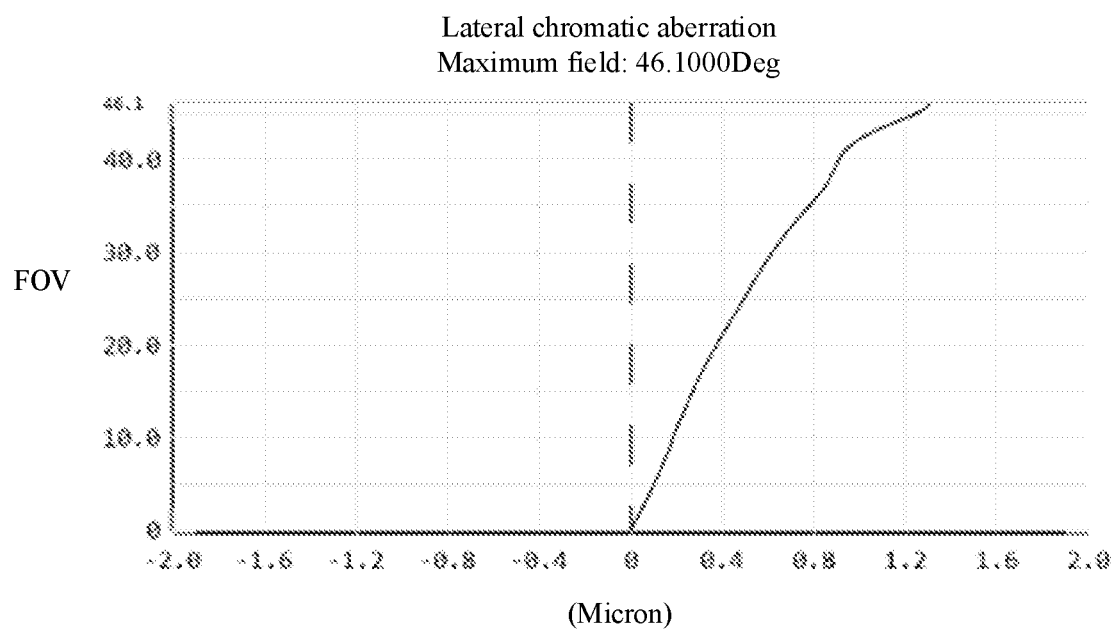
FIG. 7 is a diagram showing a lateral chromatic aberration curve of the optical lens in the second embodiment of the present disclosure.
Figure 11:
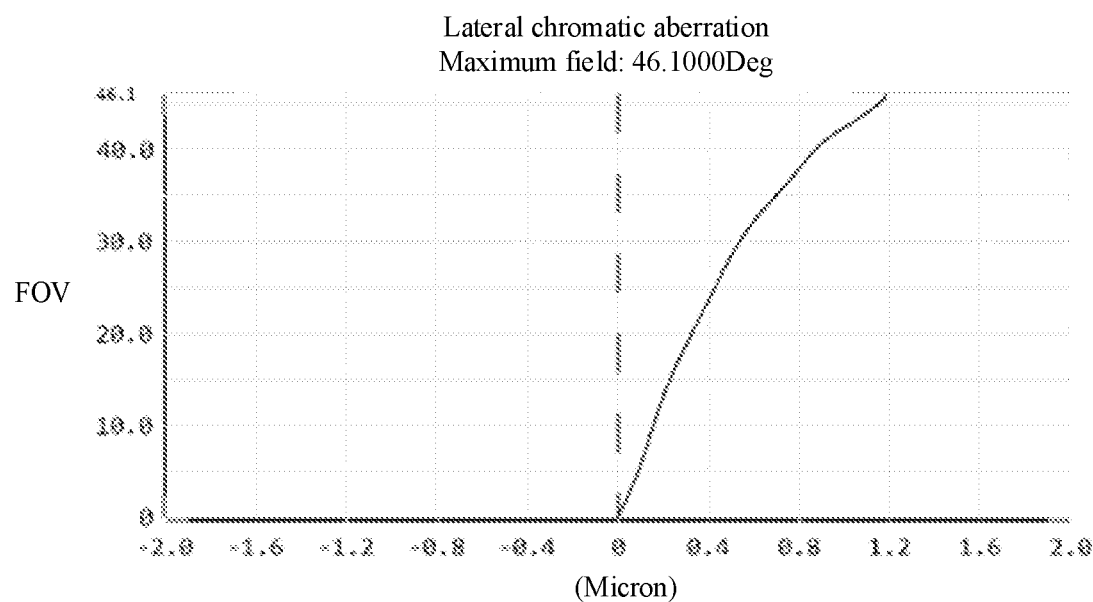
FIG. 11 is a diagram showing a lateral chromatic aberration curve of the optical lens in the third embodiment of the present disclosure.

FIG. 3 shows a lateral chromatic aberration curve of the optical lens 100, where the solid line represents the corresponding relationship between the FOV (FIG. 7 and FIG. 11 are similar to FIG. 3) and the difference obtained by subtracting the chromatic aberration of the longest wavelength light from the chromatic aberration of the shortest wavelength light. It can be seen that the lateral chromatic aberration is controlled within 1.6 μm, which shows that the optical lens 100 is good in correcting the lateral chromatic aberration. In the drawing, the dashed line corresponding to an abscissa of 0 micrometer means that the benchmark is set with the chromatic aberration of the center wavelength being zero.

Figure 4:
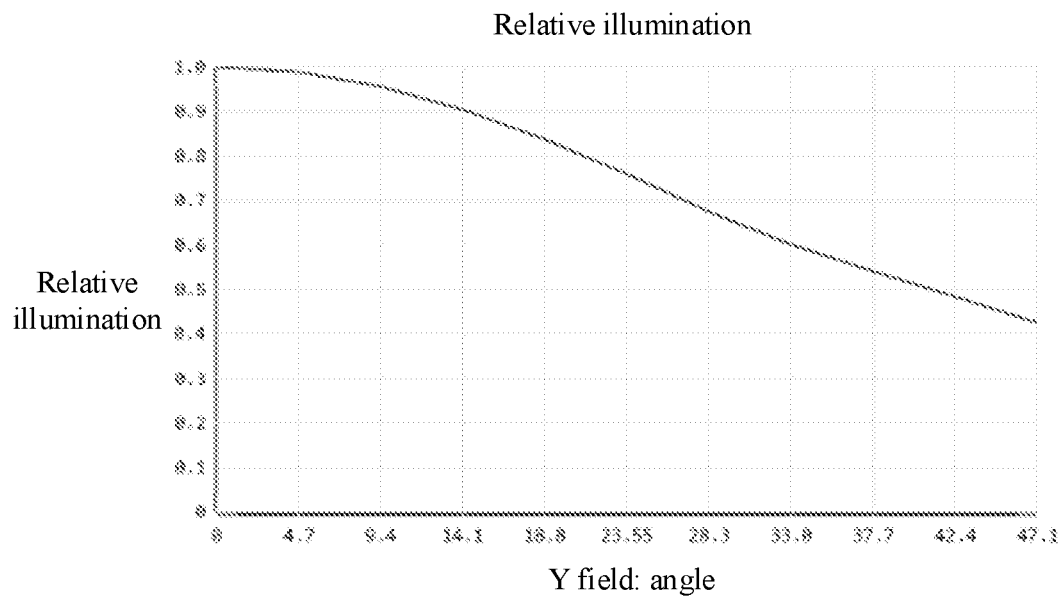
FIG. 4 is a diagram showing a relative illumination curve of the optical lens in the first embodiment of the present disclosure, where the lateral axis represents the FOV (unit: degree), and the longitudinal axis represents the relative illumination.

FIG. 4 shows a relative illumination curve of the optical lens 100, which illustrates the relative illumination at different FOV. It can be seen that the relative illumination at the maximum FOV is beyond 42%, which shows that the relative illumination at the margin fields is also relatively high, and thus the relative illumination of the optical lens 100 is well improved.

Embodiment 2

Figure 5:
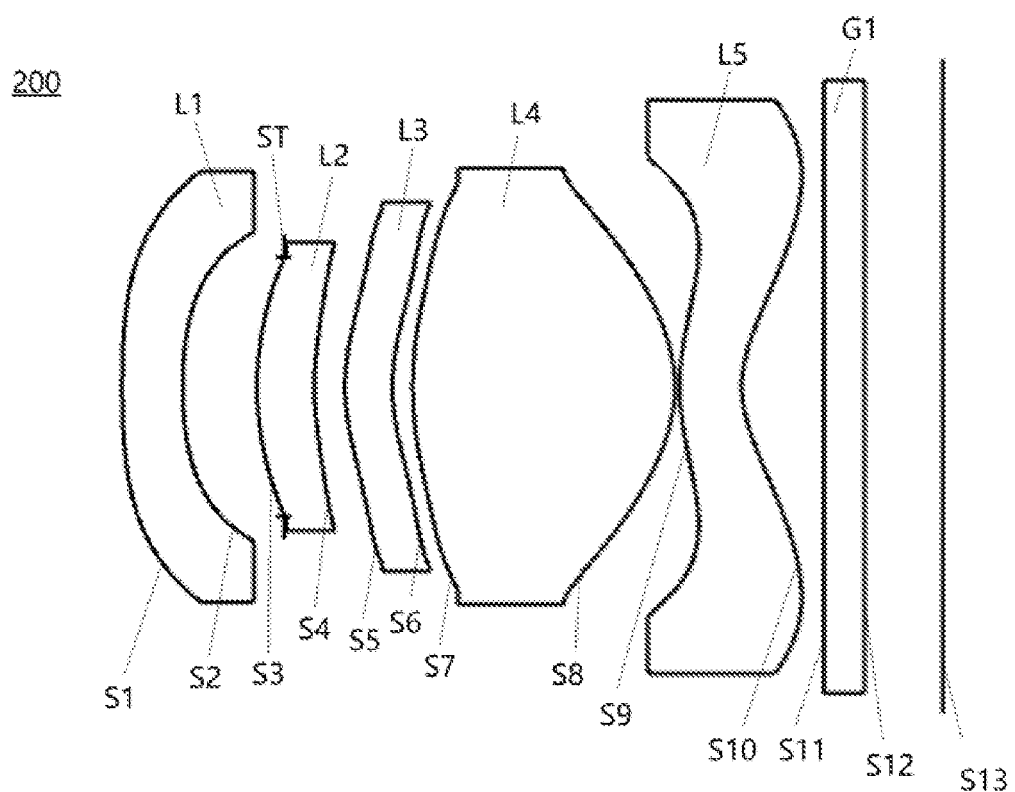
FIG. 5 is a schematic structural diagram of an optical lens in a second embodiment of the present disclosure.

Referring to FIG. 5, a schematic structural diagram of an optical lens 200 provided in this embodiment is illustrated. The structure of the optical lens 200 in this embodiment is similar to that of the optical lens 100 in the first embodiment, except that the maximum FOV of the optical lens 200 in this embodiment is 92.2°, while the maximum FOV of the optical lens 100 in the first embodiment is 94.2°, and that the radius of curvature and material of the individual lenses are differently selected.

Correlated coefficients of the individual lenses of the optical lens 200 provided in this embodiment are shown in table 3.

TABLE 3

| Surface No. | Symbol | R | d | Nd | Vd |
|---|---|---|---|---|---|
| | Object side surface | — | 400 | | |
| S1 | L1 | 4.864871 | 0.311431 | 1.6509 | 21.523 |
| S2 | | 1.823107 | 0.521646 | | |
| ST | ST | — | −0.13815 | | |
| S3 | L2 | 1.524927 | 0.294859 | 1.535 | 55.711 |
| S4 | | 1.508869 | 0.15713 | | |
| S5 | L3 | 1.018887 | 0.244962 | 1.6397 | 23.529 |
| S6 | | 1.054069 | 0.104166 | | |
| S7 | L4 | 1.7897 | 1.348655 | 1.5445 | 55.987 |
| S8 | | −0.75643 | 0.024797 | | |
| S9 | L5 | 1.063442 | 0.31963 | 1.6355 | 23.972 |
| S10 | | 0.566861 | 0.420153 | | |
| S11 | G1 | — | 0.21 | 1.5168 | 64.198 |
| S12 | | — | 0.40119 | | |
| S13 | Imaging plane | — | — | | |

Surface profile coefficients of various aspherical surfaces of the optical lens 200 in this embodiment are shown in table 4-1 and table 4-2.

TABLE 4-1

| Surface No. | k | $A_4$ | $A_6$ | $A_8$ |
|---|---|---|---|---|
| S1 | 16.76172 | 0.14524 | 0.06598 | −0.24664 |
| S2 | −63.6841 | 1.009217 | −1.88099 | 2.263504 |
| S3 | −0.38249 | −0.18605 | 0.416833 | 0.076806 |
| S4 | 2.250635 | −0.92329 | 1.962935 | −2.7795 |
| S5 | −3.94052 | −0.44905 | 0.494536 | −0.30607 |
| S6 | −0.07075 | −0.71072 | 0.21252 | 0.259484 |
| S7 | 0.599406 | −0.10182 | −0.35461 | 0.50515 |
| S8 | −0.62872 | 0.519615 | −0.52871 | 0.396205 |
| S9 | −18.8665 | 0.185043 | −0.93415 | 1.01672 |
| S10 | −4.21204 | −0.06985 | −0.12879 | 0.152364 |

TABLE 4-2

| Surface No. | $A_{10}$ | $A_{12}$ | $A_{14}$ | $A_{16}$ |
|---|---|---|---|---|
| S1 | 0.508079 | −0.68926 | 0.499648 | −0.14365 |
| S2 | 10.99662 | −46.5879 | 67.51085 | −34.0398 |
| S3 | −2.0128 | 7.145949 | −14.4594 | 11.35179 |
| S4 | −1.06174 | 8.981353 | −10.0494 | 2.468555 |
| S5 | 0.432581 | −0.97863 | 1.372826 | −0.66973 |
| S6 | −0.19854 | −0.1774 | 0.3744 | −0.21519 |
| S7 | −0.05511 | −0.17067 | 0.05104 | 0.004724 |
| S8 | 0.020216 | −0.10382 | −0.02236 | 0.04578 |
| S9 | −0.35681 | −0.32546 | 0.322185 | −0.07545 |
| S10 | −0.05285 | −0.02176 | 0.018882 | −0.00342 |

FIG. 6 shows astigmatism curves of the optical lens 200 in this embodiment. It can be seen that the astigmatism of the image surfaces in the tangential and sagittal directions is controlled within ±0.25 mm, which shows that the optical lens 200 is good in correcting the astigmatism.

FIG. 7 shows a lateral chromatic aberration curve of the optical lens 200 in this embodiment. It can be seen that the lateral chromatic aberration is controlled within 1.5 μm, which shows that the optical lens 200 is good in correcting the lateral chromatic aberration.

Figure 8:
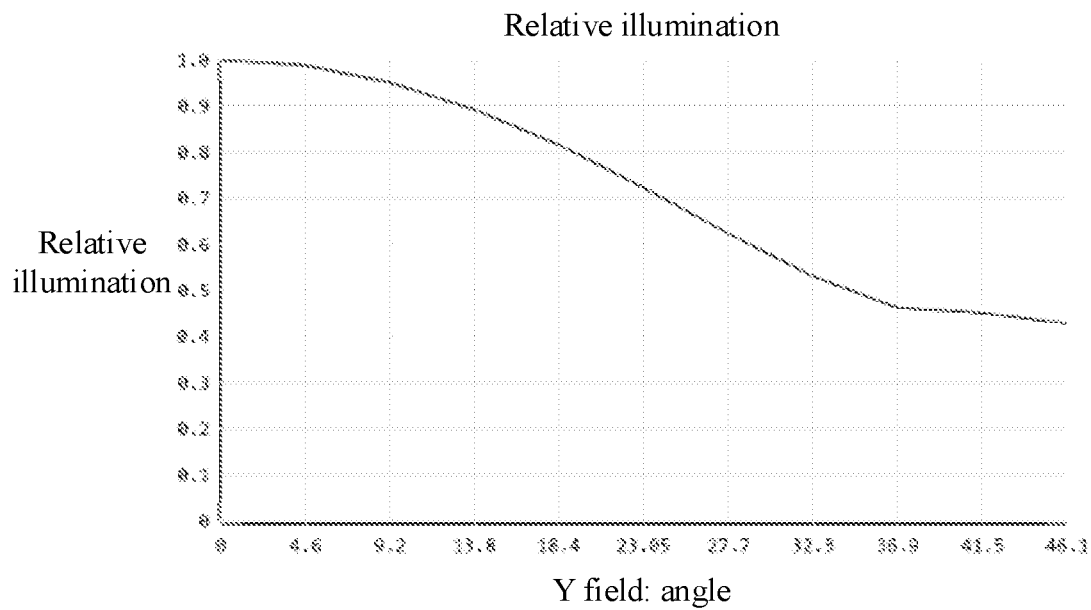
FIG. 8 is a diagram showing a relative illumination curve of the optical lens in the second embodiment of the present disclosure.

FIG. 8 shows a relative illumination curve of the optical lens 200 in this embodiment. It can be seen that the relative illumination at the maximum FOV is beyond 42%, which shows that the optical lens 200 is good in improving the relative illumination.

Embodiment 3

Figure 9:
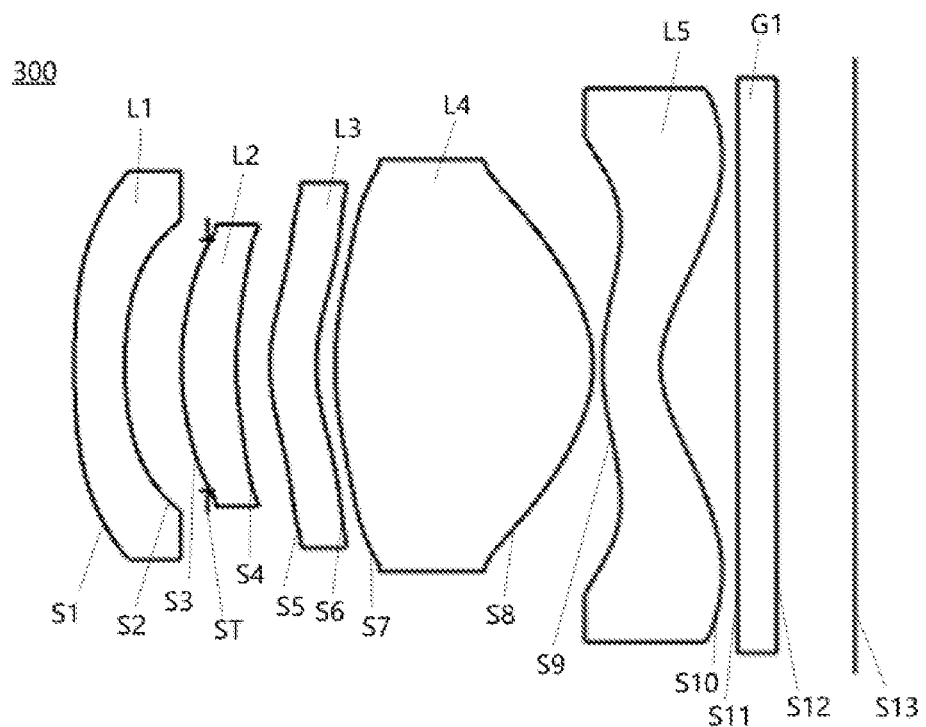
FIG. 9 is a schematic structural diagram of an optical lens in a third embodiment of the present disclosure.

Referring to FIG. 9, a schematic structural diagram of an optical lens 300 provided in this embodiment is illustrated. The structure of the optical lens 300 in this embodiment is similar to that of the optical lens 100 in the first embodiment, except that the maximum FOV of the optical lens 300 in this embodiment is 92.2°, and that the radius of curvature and material of the individual lenses are differently selected.

Correlated coefficients of the individual lenses of the optical lens 300 provided in this embodiment are shown in table 5.

TABLE 5

| Surface No. | Symbol | R | d | Nd | Vd |
|---|---|---|---|---|---|
| | Object side surface | — | 400 | | |
| S1 | L1 | 5.065028 | 0.272833 | 1.6509 | 21.523 |
| S2 | | 1.978182 | 0.447657 | | |
| ST | ST | — | −0.1406 | | |
| S3 | L2 | 1.511839 | 0.296005 | 1.535 | 55.711 |
| S4 | | 1.513798 | 0.184174 | | |
| S5 | L3 | 1.044522 | 0.252317 | 1.6509 | 21.523 |
| S6 | | 1.05532 | 0.10071 | | |
| S7 | L4 | 1.862151 | 1.397817 | 1.5445 | 55.987 |
| S8 | | −0.7487 | 0.049851 | | |
| S9 | L5 | 1.077556 | 0.316342 | 1.6509 | 21.523 |
| S10 | | 0.549871 | 0.420153 | | |
| S11 | G1 | — | 0.21 | 1.5168 | 64.198 |
| S12 | | — | 0.422946 | | |
| S13 | Imaging plane | — | — | | |

Surface profile coefficients of various aspherical surfaces of the optical lens 300 in this embodiment are shown in table 6-1 and table 6-2.

TABLE 6-1

| Surface No. | k | $A_4$ | $A_6$ | $A_8$ |
|---|---|---|---|---|
| S1 | 14.77866 | 0.143035 | 0.047593 | −0.25884 |
| S2 | −69.7972 | 0.937876 | −1.92547 | 2.223321 |
| S3 | −0.37872 | −0.19159 | 0.416404 | 0.066168 |
| S4 | 2.269648 | −0.94325 | 2.001649 | −2.74648 |
| S5 | −4.19055 | −0.43864 | 0.454045 | −0.33574 |
| S6 | −0.08606 | −0.70436 | 0.183125 | 0.246732 |
| S7 | 0.57666 | −0.12391 | −0.33277 | 0.502177 |
| S8 | −0.64708 | 0.528191 | −0.54362 | 0.391186 |
| S9 | −19.7149 | 0.195967 | −0.925 | 1.017469 |
| S10 | −3.96007 | −0.07336 | −0.12408 | 0.15181 |

TABLE 6-2

| Surface No. | $A_{10}$ | $A_{12}$ | $A_{14}$ | $A_{16}$ |
|---|---|---|---|---|
| S1 | 0.509451 | −0.68389 | 0.501741 | −0.14445 |
| S2 | 11.0576 | −46.7596 | 67.1963 | −34.0087 |
| S3 | −2.01821 | 7.49078 | −14.1876 | 10.32663 |
| S4 | −1.01589 | 9.029617 | −10.0465 | 2.366366 |
| S5 | 0.421487 | −0.96611 | 1.397403 | −0.67691 |
| S6 | −0.21555 | −0.18382 | 0.361388 | −0.19063 |
| S7 | −0.05781 | −0.16992 | 0.052567 | 0.005772 |
| S8 | 0.02192 | −0.10254 | −0.02267 | 0.045537 |
| S9 | −0.34466 | −0.31298 | 0.315951 | −0.07759 |
| S10 | −0.05235 | −0.02132 | 0.019139 | −0.00358 |

FIG. 10 shows astigmatism curves of the optical lens 300 in this embodiment. It can be seen that the astigmatism of the image surfaces in the tangential and sagittal directions is controlled with ±0.15 mm, which shows that the optical lens 300 is good in correcting the astigmatism.

FIG. 11 shows a lateral chromatic aberration curve of the optical lens 300 in this embodiment. It can be seen that the lateral chromatic aberration is controlled within 1.2 μm, which shows that the optical lens 300 is good in correcting the lateral chromatic aberration.

Figure 12:
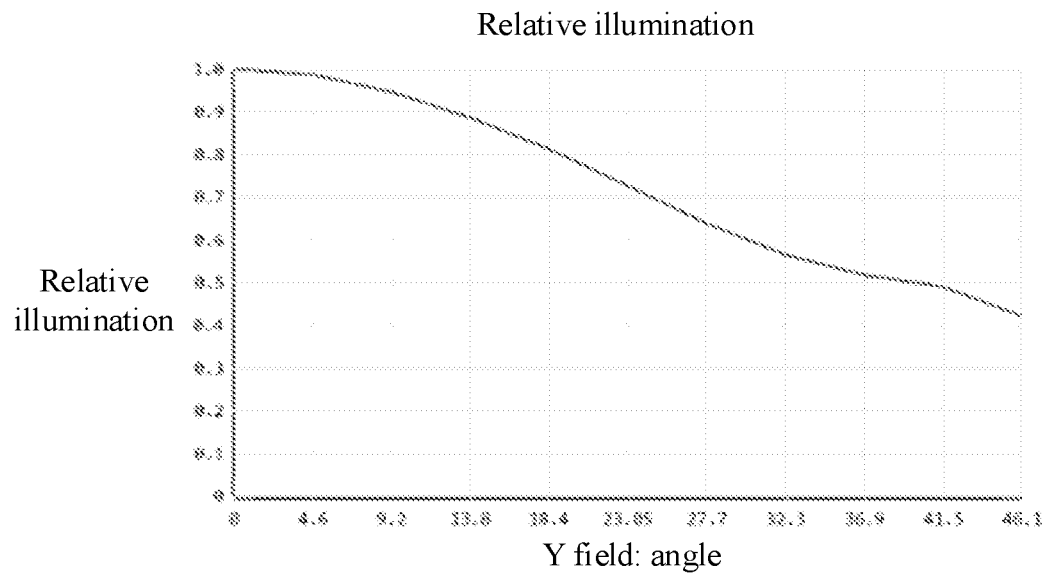
FIG. 12 is a diagram showing a relative illumination curve of the optical lens in the third embodiment of the present disclosure.

FIG. 12 shows a relative illumination curve of the optical lens 300 in this embodiment. It can be seen that the relative illumination at the maximum FOV is beyond 42%, which shows that the optical lens 300 is good in improving the relative illumination.

Table 7 illustrates optical characteristics corresponding to above three embodiments, primarily including the effective focal length f, the aperture number F #, the entrance pupil diameter EPD, the total optical length TTL, the FOV 2θ, and values corresponding to above expressions. In table 7, it can be seen that the maximum of the total optical length TTL of the system is 4.23 mm, so that the volume of the optical lens is effectively small; the maximum of the FOV 2θ of the system is 94.2 degree which is relatively large, all of which can better satisfy the requirements of the ToF lens.

TABLE 7

| Embodiments | Embodiment 1 | Embodiment 2 | Embodiment 3 |
|---|---|---|---|
| f (mm) | 1.702 | 1.624 | 1.730 |
| F# | 1.3 | 1.3 | 1.3 |
| TTL (mm) | 4.23 | 4.22 | 4.23 |
| 2θ(°) | 94.2 | 92.2 | 92.2 |
| EPD (mm) | 1.309 | 1.249 | 1.337 |
| (TTL/IH)*f(mm) | 2.119 | 2.015 | 2.152 |
| $\tan^2$(HFOV)/DM1 | 0.535 | 0.484 | 0.502 |
| (R21 − R22)/(R21 + R22) | −0.1 | 0.005 | −0.001 |
| f2 + f3 (mm) | 41.678 | 64.278 | 57.816 |
| TC23/R22 | 0.138 | 0.104 | 0.122 |
| TC12 + T2 + | 0.972 | 0.974 | 0.928 |

TABLE 7-continued

| Embodiments | Embodiment 1 | Embodiment 2 | Embodiment 3 |
|---|---|---|---|
| TC23 (mm) | | | |
| (R11 − R12)/(R11 + R12) | 0.878 | 0.455 | 0.438 |
| T1/DM1 | 0.091 | 0.1395 | 0.127 |
| f/f3 | 0.051 | 0.121 | 0.1 |
| R31/R32 | 1.030 | 0.966 | 0.989 |
| f4/f | 0.7045 | 0.748 | 0.708 |
| f5/f | −1.22 | −1.60 | −1.34 |
| R51/R52 | 2.1763 | 1.8760 | 1.96 |
| $SAC52_i$-$SAG51_i$ | (0.25, 0.42) | (0.21, 0.48) | (0.23, 0.43) |

In summary, the optical lens provided in the embodiments of the present disclosure has at least the following advantages:

(1) The optical lens provided in the embodiments of the present disclosure not only provides a high quality resolution capacity, but also has a small outer diameter of the head, a short total length, high relative illumination, a wide angle, and a large aperture. It can not only satisfy the requirements of the ToF lens, but also satisfy the requirements that the imaging device tends to be lighter, thinner, shorter and smaller and has a high screen-to-body ratio.

(2) Five plastic aspherical lenses with specific inflection are utilized, and they adopt specific surface shapes and arrangements. In this way, a compact structure and a small size are enabled while providing a large field, better balancing the requirement of wide angle and miniaturization of the lens.

Embodiment 4

Figure 13:
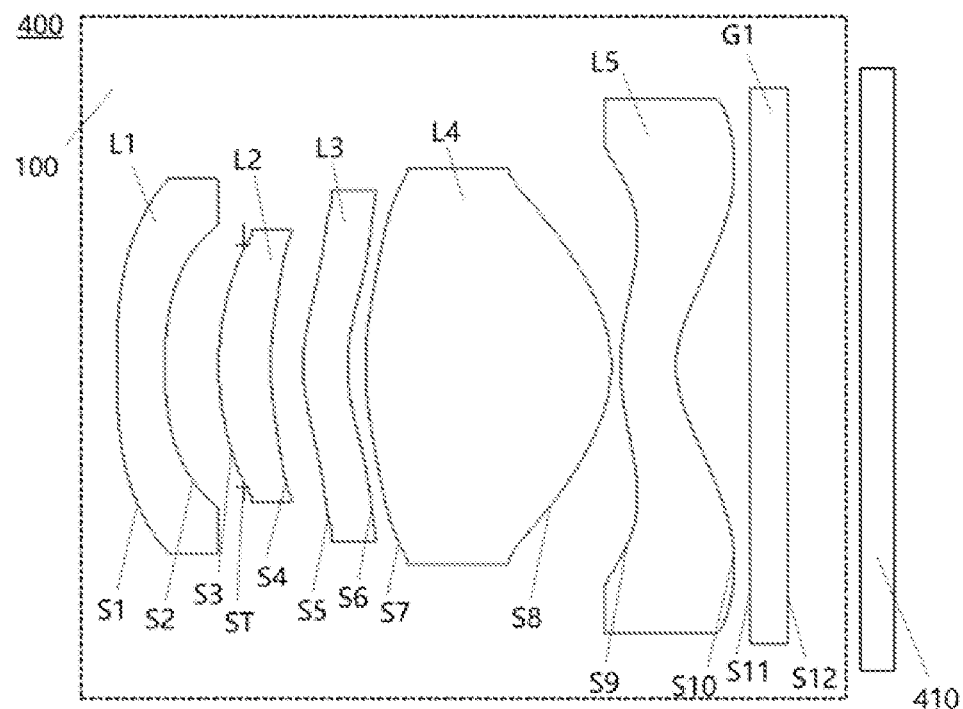
FIG. 13 is a schematic structural diagram of an imaging device in a fourth embodiment of the present disclosure.

Referring to FIG. 13, a schematic structural diagram of an imaging device 400 provided in this embodiment is illustrated. The imaging device 400 includes the optical lens (for example, the optical lens 100) in any of the above embodiments and an imaging element 410. The imaging element 410 may be a Complementary Metal Oxide Semiconductor (CMOS) graphics sensor, or may be a Charge Coupled Device (CCD) graphics sensor.

The imaging device 400 may be a camera, a terminal mobile and any electronic device which is equipped with the optical lens and in any form. The terminal mobile may be a terminal device such as a smart phone, a smart tablet and a smart reader.

The imaging device 400 provided in this embodiment includes the optical lens. Because the optical lens has advantages of such as a small size, a large field, a large aperture and high resolution, the imaging device 400 has advantages of such as a small size, a large field, a large aperture and high resolution.

Embodiment 5

Figure 14:
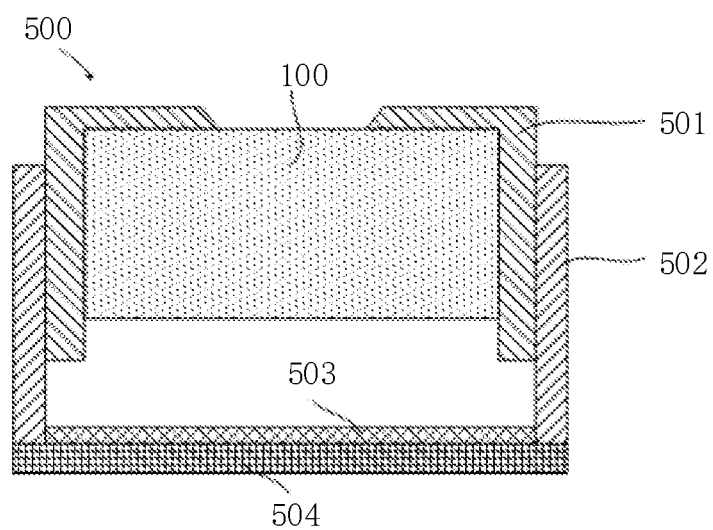
FIG. 14 is a schematic structural diagram showing a cross-section of a camera module according to a fifth embodiment of the present disclosure.

Referring to FIG. 14, a cross-section of a camera module 500 provided in this embodiment is illustrated. The camera module 500 includes the optical lens as shown in any one of the above embodiments (for example, the optical lens 100), a barrel 501, a holder 502, an image sensor 503, and a printed circuit board 504. The optical lens 100 is received in the barrel 501, and the barrel 501 is engaged with the holder 502. The image sensor 503 and the printed circuit board 504 are substantially accommodated in the holder 502. The image sensor 503 is opposite to the optical lens 100 and is mounted on the printed circuit board 504. The image sensor 503 is configured for converting light signals into electrical signals, thereby the images formed by the optical lens 100 can be converted and transmitted to a processor. The printed circuit board 504 can be further electrically connected to a chip or the processor via a flexible circuit board.

Embodiment 6

Figure 15:
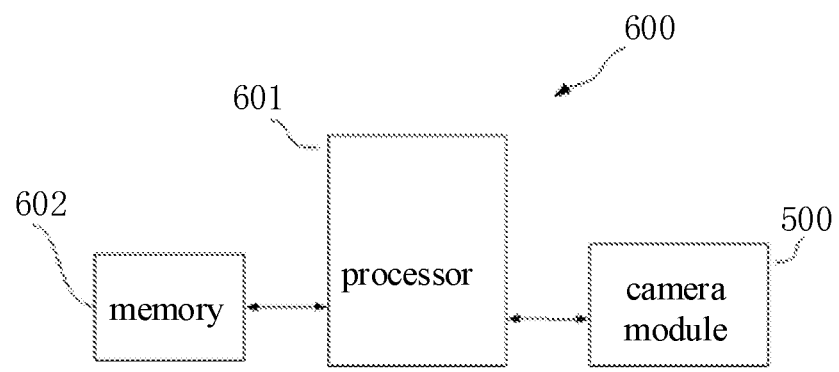
FIG. 15 is a schematic clock diagram of a terminal camera according to a sixth embodiment of the present disclosure.
Figure 16:
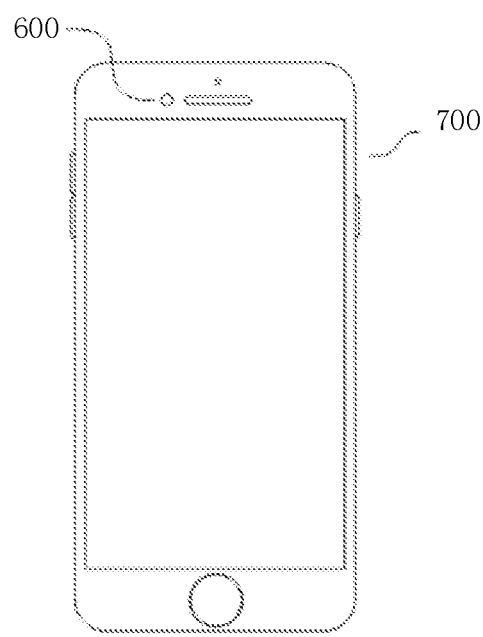
FIG. 16 is a schematic diagram of the terminal camera according to the sixth embodiment of the present disclosure.

Referring to FIG. 15 and FIG. 16, a terminal camera 600 is applied to an electronic device 700. Here, the terminal camera 600 is illustrated as a front camera of an electronic device, but it also may be a rear camera of the electronic device, which is not limited in the embodiments of the disclosure. The terminal camera 600 includes the camera module 500 as mentioned above, a processor 601, and a memory 602. The camera module 500 is configured to capture images, the processor 601 is configured to process the captured images, and the memory 602 is configured to store the captured images. The processor 601 is communicated with the camera module 500 and the memory 602. That is, the electrical signals of the images can be transmitted to the processor 601 and stored in the memory 602.

The above embodiments only illustrate several implementations of the present disclosure, and the descriptions thereof are specific and detailed, but they should not be understood as limiting the scope of the present disclosure. It should be noted that, for those of ordinary skill in the art, several modifications and variants can be made without departing from the concept of the present disclosure, and they all fall within the protection scope of the present disclosure. Therefore, the protection scope of the patent of the present disclosure should be subject to the appended claims.

What is claimed is:

1. An optical lens, from an object side to an image side along an optical axis, the optical lens sequentially comprising:
    a first lens with a negative focal power, wherein an object side surface of the first lens is convex, and an image side surface of the first lens is concave;
    a stop;
    a second lens with a positive focal power, wherein an object side of the second lens is convex, and an image side surface of the second lens is concave;
    a third lens with a positive focal power, wherein an object side surface of the third lens is convex, and an image side surface of the third lens is concave;
    a fourth lens with a positive focal power, wherein both an object side surface of the fourth lens and an image side surface of the fourth lens are convex;
    a fifth lens with a negative focal power, wherein an object side surface of the fifth lens is convex at a paraxial region thereof and has at least one inflection point, and an image side surface of the fifth lens is concave at a paraxial region thereof and has at least one inflection point; and
    a filter;
    wherein the optical lens meets an expression:

$2.0 \text{ mm} < (TTL/IH)*f < 2.2 \text{ mm}$;

where TTL represents a distance from the object side surface of the first lens to an imaging plane of the optical lens on the optical axis, IH represents an actual image height of the optical lens on the imaging plane, and f represents an effective focal length of the optical lens.

2. The optical lens according to claim 1, wherein the optical lens meets an expression:

$0.48 \text{ mm}^{-1} < \tan^2(HFOV)/DM1 < 0.54 \text{ mm}^{-1}$;

where HFOV represents half the maximum field of view of the optical lens, and DM1 represents an effective diameter of the first lens.

3. The optical lens according to claim 1, wherein the optical lens meets an expression:

$-0.15<(R21-R22)/(R21+R22)<0.1;$ where R21 represents a radius of curvature of the object side surface of the second lens, and R22 represents a radius of curvature of the image side surface of the second lens.

4. The optical lens according to claim 1, wherein the optical lens meets an expression:

$40\ mm<f2+f3<70\ mm;$ where f2 represents an effective focal length of the second lens, and f3 represents an effective focal length of the third lens.

5. The optical lens according to claim 1, wherein the optical lens meets an expression:

$0.1<TC23/R22<0.14;$ where TC23 represents a spacing distance on the optical axis from the image side surface of the second lens to the object side surface of the third lens, and R22 represents a radius of curvature of the image side surface of the second lens.

6. The optical lens according to claim 1, wherein the optical lens meets an expression:

$0.92\ mm<TC12+T2+TC23<0.98\ mm;$ where TC12 represents a spacing distance from the image side surface of the first lens to the object side surface of the second lens on the optical axis, T2 represents a center thickness of the second lens, and TC23 represents a spacing distance on the optical axis from the image side surface of the second lens to the object side surface of the third lens.

7. The optical lens according to claim 1, wherein the optical lens meets expressions:

$0.4<(R11-R12)/(R11+R12)<0.9;$ $0.09<T1/DM1<0.14;$ where R11 represents a radius of curvature of the object side surface of the first lens, R12 represents a radius of curvature of the image side surface of the first lens, T1 represents a center thickness of the first lens, and DM1 represents an effective diameter of the first lens.

8. The optical lens according to claim 1, wherein the optical lens meets an expression:

$0.05<f/f3<0.13;$ where f3 represents an effective focal length of the third lens, and f represents the effective focal length of the optical lens.

9. The optical lens according to claim 1, wherein the optical lens meets an expression:

$0.9<R31/R32<1.1;$ where R31 represents a radius of curvature of the object side surface of the third lens, and R32 represents a radius of curvature of the image side surface of the third lens.

10. The optical lens according to claim 1, wherein the optical lens meets expressions:

$0.70<f4/f<0.75;$ $-1.7<f5/f<-1.2;$ where f4 represents an effective focal length of the fourth lens, f5 represents an effective focal length of the fifth lens, and f represents the effective focal length of the optical lens.

11. The optical lens according to claim 1, wherein the optical lens meets expressions:

$1.8<R51/R52<2.2;$ $0.2<SAG52_i-SAG51_i<0.5;$ where R51 represents a radius of curvature of the object side surface of the fifth lens, R52 represents a radius of curvature of the image side surface of the fifth lens, $SAG51_i$, represents a vector height at any point of the object side surface of the fifth lens, $SAG52_i$ represents a vector height at any point of the image side surface of the fifth lens and i represents the any point.

12. A camera module, comprising an optical lens and an image sensor opposite to the optical lens, wherein from an object side to an image side along an optical axis, the optical lens sequentially comprises:
   a first lens with a negative focal power, wherein an object side surface of the first lens is convex, and an image side surface of the first lens is concave;
   a stop;
   a second lens with a positive focal power, wherein an object side of the second lens is convex, and an image side surface of the second lens is concave;
   a third lens with a positive focal power, wherein an object side surface of the third lens is convex, and an image side surface of the third lens is concave;
   a fourth lens with a positive focal power, wherein both an object side surface of the fourth lens and an image side surface of the fourth lens are convex;
   a fifth lens with a negative focal power, wherein an object side surface of the fifth lens is convex at a paraxial region thereof and has at least one inflection point, and an image side surface of the fifth lens is concave at a paraxial region thereof and has at least one inflection point; and
   a filter;
   wherein the optical lens meets an expression:

$2.0\ mm<(TTL/IH)*f<2.2\ mm;$ where TTL represents a distance from the object side surface of the first lens to an imaging plane of the optical lens on the optical axis, IH represents an actual image height of the optical lens on the imaging plane, and f represents an effective focal length of the optical lens.

13. The camera module according to claim 12, wherein the optical lens meets at least one of the following expressions:

$0.48\ mm^{-1}<\tan^2(HFOV)/DM1<0.54\ mm^{-1};$ $0.4<(R11-R12)/(R11+R12)<0.9;$ $0.09<T1/DM1<0.14;$ where HFOV represents half the maximum field of view of the optical lens, DM1 represents an effective diameter of the first lens, R11 represents a radius of curvature of the object side surface of the first lens, R12 represents a radius of curvature of the image side surface of the first lens, and T1 represents a center thickness of the first lens.

14. The camera module according to claim 12, wherein the optical lens meets at least one of the following expressions:

$-0.15 < (R21-R22)/(R21+R22) < 0.1;$ $40\text{ mm} < f2+f3 < 70\text{ mm};$ $0.1 < TC23/R22 < 0.14;$ where R21 represents a radius of curvature of the object side surface of the second lens, R22 represents a radius of curvature of the image side surface of the second lens, f2 represents an effective focal length of the second lens, f3 represents an effective focal length of the third lens, and TC23 represents a spacing distance on the optical axis from the image side surface of the second lens to the object side surface of the third lens.

15. The camera module according to claim 12, wherein the optical lens meets an expression:

$0.92\text{ mm} < TC12+T2+TC23 < 0.98\text{ mm};$ where TC12 represents a spacing distance from the image side surface of the first lens to the object side surface of the second lens on the optical axis, T2 represents a center thickness of the second lens, and TC23 represents a spacing distance on the optical axis from the image side surface of the second lens to the object side surface of the third lens.

16. The camera module according to claim 12, wherein the optical lens meets at least one of the following expressions:

$0.05 < f/f3 < 0.13;$ $0.9 < R31/R32 < 1.1;$ where f3 represents an effective focal length of the third lens, f represents the effective focal length of the optical lens, R31 represents a radius of curvature of the object side surface of the third lens, and R32 represents a radius of curvature of the image side surface of the third lens.

17. The camera module according to claim 12, wherein the optical lens meets at least one of the following expressions:

$0.70 < f4/f < 0.75;$ $-1.7 < f5/f < -1.2;$ $1.8 < R51/R52 < 2.2;$ $0.2 < SAG52_i - SAG51_i < 0.5;$ where f4 represents an effective focal length of the fourth lens, f5 represents an effective focal length of the fifth lens, f represents the effective focal length of the optical lens, R51 represents a radius of curvature of the object side surface of the fifth lens, R52 represents a radius of curvature of the image side surface of the fifth lens, $SAG51_i$ represents a vector height at any point of the object side surface of the fifth lens, $SAG52_i$ represents a vector height at any point of the image side surface of the fifth lens and i represents the any point.

18. The camera module according to claim 12, wherein a d-line refractivity of the second lens of the optical lens is 1.535, and an Abbe number of the second lens of the optical lens is 55.711.

19. The camera module according to claim 12, wherein a d-line refractivity of the fourth lens of the optical lens is 1.5445, and an Abbe number of the fourth lens of the optical lens is 55.987.

20. A terminal camera, comprising a camera module, a processor, and a memory, wherein the camera module is configured to capture one or more images, the processor is configured to process the captured images, and the memory is configured to store the captured images; the camera module comprises an optical lens and an image sensor opposite to the optical lens, from an object side to an image side along an optical axis, the optical lens sequentially comprising:

a first lens with a negative focal power, wherein an object side surface of the first lens is convex, and an image side surface of the first lens is concave;

a stop;

a second lens with a positive focal power, wherein an object side of the second lens is convex, and an image side surface of the second lens is concave;

a third lens with a positive focal power, wherein an object side surface of the third lens is convex, and an image side surface of the third lens is concave;

a fourth lens with a positive focal power, wherein both an object side surface of the fourth lens and an image side surface of the fourth lens are convex;

a fifth lens with a negative focal power, wherein an object side surface of the fifth lens is convex at a paraxial region thereof and has at least one inflection point, and an image side surface of the fifth lens is concave at a paraxial region thereof and has at least one inflection point; and a filter;

wherein the optical lens meets an expression:

$2.0\text{ mm} < (TTL/IH)*f < 2.2\text{ mm};$ where TTL represents a distance from the object side surface of the first lens to an imaging plane of the optical lens on the optical axis, IH represents an actual image height of the optical lens on the imaging plane, and f represents an effective focal length of the optical lens.

* * * * *